United States Patent [19]
Jasenof et al.

[11] Patent Number: 5,516,549
[45] Date of Patent: May 14, 1996

[54] METHOD OF APPLYING A STRIATED COATING

[75] Inventors: Kenneth E. Jasenof, Skokie; Ronald J. Lewarchik, Sleepy Hollow, both of Ill.; Douglas A. Stumpfl, Fairlawn; David K. Black, Wadsworth, both of Ohio

[73] Assignee: Morton International, Inc., Chicago, Ill.

[21] Appl. No.: 332,283

[22] Filed: Oct. 31, 1994

[51] Int. Cl.$^6$ ............................... B05D 3/12; B21C 47/00
[52] U.S. Cl. ...................... 427/178; 427/287; 427/388.1; 427/428
[58] Field of Search ................................ 427/178, 428, 427/388.1, 287

Primary Examiner—Bernard Pianalto
Attorney, Agent, or Firm—Robert M. Didrick; Gerald K. White

[57] ABSTRACT

A polyester-based coating composition capable of forming a striated pattern on a metal surface at a film thickness less than half of that of PVC plastisol films is provided by a thixotropic composition having a thix index of from about 1.5 to about 3 and comprising a hydroxy-functional polyester, a thixotropy-inducing rheologic agent and curing agent. The striated coating is applied to sheet metal in a coil coating operation by introducing the composition into a paint pan of a coil coater, transferring said composition from said paint pan to an applicator roll by rotating a pick-up roll in contact with the composition and with said applicator roll; continuously withdrawing a sheet of metal from a coil thereof and coating said sheet by contacting it with the applicator roll; curing the coating on said sheet by passing the sheet through an oven at an elevated temperature; and continuously rewinding said sheet into a coil.

11 Claims, No Drawings

METHOD OF APPLYING A STRIATED COATING

BACKGROUND OF THE INVENTION

Field of the Invention

This invention relates to textured coatings for metal articles. In particular, it relates to polyester-based coatings which offer the appearance of a striated poly(vinyl chloride) (PVC) plastisol-based coating. More particularly, this invention relates to coil coating compositions which give a striated pattern simulating a wood grain on aluminum siding.

Thixotropy is the property of a liquid whereby its viscosity decreases as it is stirred at a constant shear rate but increases again to its original value some time after the shear rate is reduced to zero. In the coil coating operation, a coil of sheet metal is uncoiled as it is pulled through a series of rollers, one or more of which is a paint applicator roller, at up to 600 feet per minute. It is then passed through a curing oven and coiled again for the market. The paint is picked up by a roller rotating in the paint pan and transferred to an applicator roller. The thixotropy that is necessary for the formation and retention of the striations must be balanced against the need for recirculation of the paint from the paint pan to a drum from which it was pumped into the pan.

DESCRIPTION OF RELATED ART

Existing technology for the creation of a striated appearance on sheet metal on a single pass through a coil coating apparatus is limited to the use of PVC plastisols. The film thickness of said plastisols must be from 3 to 5 mils in order to give proper coverage to the substrate and to produce the desired striated pattern. The cost of such a thick film per square foot is relatively high when compared with other coatings. Also, the poor heat stability of PVC resins is a problem during the manufacture of the plastisol and during its use on the coil coating line. The heat sensitivity can lead to gelation of the plastisol which makes it unusable.

SUMMARY OF THE INVENTION

It is an object of this invention, therefore, to provide a polyester-based coating composition which is capable of forming a striated pattern on metal.

It is a related object of this invention to provide a metal article having a striated coating which is less than half as thick as the PVC plastisol films of the prior art.

It is further object of this invention to provide a low-cost method for applying a striated coating on a sheet of metal in a coil coating operation.

It is a related object of this invention to provide metal siding for houses and the like which has better weathering characteristics than those having the PVC plastisol coatings of the prior art.

It is another object of this invention to provide a stain resistant, striated thin film for metal articles.

It is yet another object of this invention to provide a multicolored, textured coating made up of two or more thin films of the polyester-based coating.

These and other objects of the invention which will become apparent from the following description thereof are achieved by a hydroxy-functional polyester-based coil coating paint having the necessary rheology for the creation of a finish having a striated pattern when applied and upon curing.

The necessary balance between the thixotropy that is necessary for the formation and retention of the striations and the need for recirculation of the paint from the paint pan to the drum from which it was pumped is attained in this invention by a thixotropic coil coating composition having a thix index of from about 1.5 to about 3 and comprising a hydroxy-functional polyester, a thixotropy-inducing rheologic agent, and a curing agent. Suitably, the composition may comprise a mixture of hydroxy-functional polyesters.

DESCRIPTION OF THE PREFERRED EMBODIMENTS OF THE INVENTION

The hydroxy-functional polyesters useful in this invention have a hydroxyl number of from about 30 to about 120 and a viscosity of from about 1000 to about 10,000 centipoises at 25° C. Said polyesters constitute from about 30 to about 50 weight percent of the coil coating compositions of this invention. Mixtures of said polyesters have an average hydroxyl number of from about 40 to about 60. The polyesters are made by the condensation of polyhydric alcohols and polycarboxylic acids. Examples of the polyhydric alcohols include di-, tri-, and tetra-hydric compounds such as ethylene glycol, 1,3-propylene glycol, 1,4-butylene glycol, 1,6-hexanediol, diethylene glycol, triethylene glycol, neopentyl glycol, 1,4-cyclohexanediol, 2,2,4-trimethyl-1,3-pentanediol, trimethylol ethane, trimethylol propane, pentaerythritol and dipentaerythritol. Mixtures of two or more of the polyhydric compounds may be used. Adipic, methyladipic, malonic, sebacic, suberic, glutaric, fumaric, itaconic, malic, diglycolic, the 1,3— and 1,4-cyclohexanedicarboxylic acids, pimelic, azelaic, 1,12-dodecanedioic, maleic acid, maleic anhydride, succinic and tetrapropenyl succinic acids and their anhydrides, and tetrahydrophthalic anhydride exemplify the saturated aliphatic acids and anhydrides from which the polyesters useful in this invention may be derived. Mixtures of two or more of the polycarboxylic acids may be used, also. Examples of aromatic polycarboxylic acids which may be used in place of or in combination with the aliphatic or cycloaliphatic acids include the phthalic acids and phthalic anhydride, benzophenone dicarboxylic acid, diphenic acid, 4,4-dicarboxydiphenyl ether, and trimellitic acid, etc.

Polycondensation of the reactants is effected by heating them to a temperature in the range of from 100° C. to 250° C. with the aid of inert gas sparging or a vacuum or both. The reaction is continued until the acid number is reduced to the lowest practical value consistent with the desired molecular weight, preferably to about 10 or lower, preferably 4 or lower and, more preferably, from about 1 to about 2. The rate of the condensation reaction may be increased by the use of conventional catalysts such as p-toluenesulfonic acid and the like. The molecular weight of the polyesters used in the coil coating composition of this invention is important because the thixotropy-inducing additives can not overcome the natural flow of polyesters having a very low molecular weight and, on the other hand, the flexibility and physical properties of the coating on the substrate are poor when the molecular weight is too high. The weight average molecular weight (Mw) may range from about 500 to about 25,000, preferably between about 2000 and about 12,000.

Hydroxyl-functional polyesters suitable for formulating the coil coating compositions of this invention are available commercially. Examples of said polyesters include the POLYMAC 935 resin sold by McWhorter, Inc., which has a hydroxyl number of about 40–50 (100% solids). Other polyester resins suitable for use in this invention are the SCD 1060 and SCD 16602 by Etna Products, Inc., Cargill's 66-6613 resin, CHEMPOL 11-3369 resin by Freeman Chemical Corporation, and the AROPLAZ 6025-Z-70 resin by Reichhold having an OH value of about 62 (70% solids).

Combinations of several of the polyesters are suitable for the purposes of this invention when the average hydroxyl number of the mixture is from about 40 to about 60. Thus, the number of crosslinking sites is minimized so that a desirable level of flexibility is maintained. Mixtures of two, three, four, or more polyesters are suitable but the compatibility of each with the others must be taken into account. Compatibility may be tested merely by mixing the polyesters together; a clear, free flowing solution should result. Examples of mutually compatible polyesters are given in the working examples which follow below.

In a preferred embodiment of the invention, from about 60 to about 70 percent of the mixture of polyesters is a polyester having a hydroxyl number of about 50, from about 20 to about 30 percent is a polyester having a hydroxyl number of about 30, and from about 5 to about 10 percent is a polyester having a hydroxyl number of about 120, all on a weight basis. A particularly preferred mixture contains from about 65 to about 75 percent of a polyester having a hydroxyl number of about 30 and from about 25 to about 35 percent of a polyester having a hydroxyl number of about 85.

The polyesters are curable through the hydroxyl groups with aminoplasts and with aliphatic and aromatic isocyanates. The aminoplasts are oligomers that are the reaction products of aldehydes, particularly formaldehyde, with amino— or amido-groupcarrying substances exemplified by melamine, urea, dicyanodiamide, and benzoguanamine. It is preferable in many instances to employ precursors of aminoplasts such as hexamethylol melamine, dimethylol urea, and their etherified forms, i.e, modified with alkanols having from one to four carbon atoms. Hexamethoxymethyl melamine and tetramethoxy glycoluril exemplify said etherified forms. Thus, a wide variety of commercially available aminoplasts and their precursors can be used for combining with the linear polyesters of this invention. Particularly preferred are the amino crosslinking agents sold by American Cyanamid under the trademark Cymel. In particular, the Cymel 301, Cymel 303, and Cymel 385 alkylated melamine-formaldehyde resins are useful. Of course, it is possible to use mixtures of all of the above N-methylol products.

Aminoplast curing agents are generally provided in an amount sufficient to react with at least one-half the hydroxyl groups of the polyester, i.e., be present at least one-half the stoichiometric equivalent of the hydroxyl functionality. Preferably, the cross-linking agent is sufficient to substantially completely react with all of the hydroxyl functionality of the polyester, and cross-linking agents having nitrogen cross-linking functionality are provided in amounts of from about 2 to about 12 equivalents of nitrogen cross-linking functionality per equivalent of hydroxyl functionality of the polyester. This typically translates to an aminoplast being provided at between about 10 and about 70 phr.

The curing of hydroxyl-functional polyesters with an aminoplast takes place in about 10 to 90 seconds at temperatures within the range of from about 190°–250° C. (about 375°–480° F.).

Acidic catalysts may be used to modify the curing of the polyester with an aminoplast resin by lowering the required temperature or raising the reaction rate or both. When it is desirable to lower the rate at ambient storage temperatures, the acidic catalyst may be blocked with an amine or other suitable blocking agents such as oxirane modifying materials. Volatile amines which may escape from the curing film when the catalyst is unblocked by heat are suitable for this purpose. It is particularly desirable for the purposes of this invention to delay full curing of the composition until the coated metal substrate has traveled about three-fourths of the length of the curing oven. In a particular embodiment, the dwell time before full curing was about 33 seconds. An amine-blocked dinonylnaphthalenesulfonic acid sold by King Industries under the trademark and number NACURE 1557 is an example of the blocked acid catalyst contemplated for use in the aminoplast curing of the coil coating composition of this invention. The curing may also be retarded by the addition of free amines such as triethanolamine. Also, the potential reaction of the acidic catalyst with the hydroxyl groups on the polyester may be blocked by the addition of relatively non-volatile alcohols such as butanol and 2-ethylhexanol; such alcohols also provide viscosity stability in the package. They inhibit the reaction of the polyester with the aminoplast.

Di— or polyisocyanates cure the hydroxy-functional polyester resin by forming urethane linkages between the polymer chains at the hydroxyl group sites. Aliphatic diisocyanates are exemplified by hexamethylene diisocyanate (HDI), diisocyanato dicyclohexylmethane (sold under the trademark DESMODUR W by Miles Chemical), and isophorone diisocyanate (IPDI). Cytec's TMXDI polyisocyanate is another example of a suitable curing agent. The low-temperature reactivity of free diisocyanates may be lessened by adducting them with blocking agents selected from phenol, cresols, isononylphenol, amides such as e-caprolactam, oximes such as methyl-ethyl ketoxime and butanone oxime, active methylene group-containing compounds such as diethylmalonate and isopropylidene malonate and the acetoacetates, and sodium bisulfite. The adducts have a weak bond which breaks at an elevated temperature to regenerate the blocking agent and the free diisocyanate which can react with the polyester in the desired manner. Examples of the blocked diisocyanates include caprolactam blocked isophorone diisocyanate and caprolactam blocked hexamethylene diisocyanate. Examples of commercially available curing agents of this type are the BL-3175A, BL-4165, XP-7012, XP-7001, XP-7018 products sold under the DESMODUR trademark and the BAYHYDROL 116, and DESMOTHERMXP-7024E curing agents sold by Miles.

When the diisocyanates are used as the curing agent, care must be taken that the isocyanate groups are used in excess over the amount which is necessary for combining with the OH groups. The excess is from about 20 to 250%, preferably 50 to 100%, by weight. The reaction of the polyester with the diisocyanate is performed in the absence of moisture at a temperature of from about 120° to about 230° C. and, when a blocked diisocyanate is used, the temperature is preferably about 200° C. or higher. Combinations of blocked and unblocked di— or tri-isocyanates may be used to good effect in some circumstances. Dibutyltin dilaurate and triethylene diamine are examples of the catalysts that may be used to promote the diisocyanate cure. The use of blocked isocyanates in the curing of coatings is described in a paper presented by T. A. Potter, J. W. Rosthauser, and H. G. Schmelzer at the Water-Borne & HigherSolids Coatings Symposium at New Orleans on Feb. 5–7, 1986; the paper is incorporated herein by reference.

Hydroxyl cross-linking agents are also described in U.S. Pat. No. 2,940,944 and German patent applications 1,060,596; 1,083,548; and 1,089,549, all of which are incorporated herein by reference.

The "thix index" pertains to a ratio of Brookfield viscosities of the composition; the thix index of Newtonian liquids is about 1, for dilatant liquids it is less than 1, and thixotropic liquids have an index greater than 1. It is the quotient of the viscosity at a low rpm divided by the viscosity at a high rpm. The measurements are made at the same temperature and with the same spindle for both speeds. In this instance, the temperature was 25° C. and the low speed measurement was made at 10 rpm and the high speed at 50 rpm. Preferably, the thix index of the coil coating composition of this invention is not more than about 2.5 and a value of about 2 or less is even more preferable. The amount of thixotropy-inducing additives in the coil coating compositions of this invention is from about 0.5 to about 5 weight percent, preferably from about 1 to about 3 percent, and even more preferably from about 1 to about 2 percent.

The thixotropy-inducing additives are preferably selected from the fumed silicas having a surface area of about 200±25 to about 390±40 m$^2$/g offered by Cabot Corporation under the Cab-O-Sil trademark. A porous, friable silica such as the Cab-O-Sil M5 silica and DEGUSSA R972 silica is a preferred thixotropic agent. Included among other thixotropic agents are the organophilic bentonite clays prepared by the chemical modification of the clays with a quaternary ammonium salt such as dimethyl-dihydrogenated tallow ammonium chloride. Surface hydroxyl groups on aggregates of the dispersed clay or silicon dioxide link the aggregates together by hydrogen bonds within the coating composition and form networks which partially immobilize the liquid portion thereof. The hydrogen bonds are broken under shear only to form again when the shearing force is removed. Other suitable thixotropic agents for the coil coating composition of this invention include polyamide waxes, castor oil derivatives, and overbased calcium sulfonate gels. The polyamide waxes are solids having minimal reactivity which swell in the coating composition and cause chain entanglements which are disrupted under shear. A thixotropic polyamide is sold by Rheox under the trademark and number THIXATROL SR100. Castor oil is principally the hydroxy-functional glyceride of ricinoleic acid and the thixotropic derivatives are produced by sulfonation and hydrogenation, among other modifications. Again, the hydrogen bonding of pendant hydroxyl groups creates structures which reversibly increase the viscosity of compositions containing them. An example of such a castor oil derivative is the THIXATROL 289 additive sold by Rheox. The overbased calcium sulfonate gels are colloidally stable dispersions of calcite and calcium petrosulfonate in an organic medium. Both neutral and overbased calcium sulfonate gels are available under the IRCOGEL trademark from The Lubrizol Corporation. Combinations of two or more of the different thixotropes are suitable for the purposes of this invention.

Epoxy resins are suitably present in amounts ranging from about 0.5 to about 1.5 weight percent in the coil coating compositions of this invention in order to improve their adhesion to the sheet metal substrate. Said epoxy resins are exemplified by the EPON 1001 and 1002 solid grade resins sold by Shell Chemical Company.

From about 0.25 to about 0.75 weight percent of one or more acrylic flow agents is employed in the coil coating compositions of this invention. An acrylic copolymer which is a flow additive may also serve as a barrier to stains by migrating to the surface of the coating. Stain resistance is an important property for coated articles of all sorts but especially so for aluminum siding and the like. The striated coating of this invention is stain resistant partly due to the presence of about 0.25 weight percent of such an acrylic flow agent but also because of the presence of about the same amount of a silicone such as that sold under the trademark SILWET L7500 by OSi Specialties. Certain flow aids such as one sold under the trademark and number COROC A620A2 by Cook Composites and Polymers and some of the MODAFLOW additives are less preferred because they lessen the striations and give poorer stain resistance.

White pigments such as titanium dioxide and antimony oxide are present in amounts ranging from about 20 to about 40 weight percent in the coil coating compositions of this invention. Color pigments (i.e., other than white) may be present in smaller amounts such as from about 0.1 to about 20% by weight. Such pigments may be organic or inorganic. Examples of the inorganic pigments include red and yellow iron oxides, carbon black, chrome yellow, moly orange, titanium yellow, nickel titanate yellow, chrome greens, and the like. Phthalocyanine blue is an example of a suitable organic pigment.

Lubricants such as a petroleum hydrocarbon wax, a polyethylene, or a polytetrafluoroethylene, flatting agents such as the SILCRON G600 silica sold by SCM, and anti-sag agents such as the DISLON 6900-20X polyamide sold by King Industries may also be present in the coil coating compositions of this invention, each in amounts ranging from about 0.10 to about 3 weight percent. The polyethylene also contributes to stain resistance.

From about 5 to about 10 weight percent of solvents may be used in the coil coating compositions of this invention to adjust its viscosity. Aromatic solvents are much preferred because the formation of striations is enhanced. Other solvents are exemplified by dipropyleneglycol methyl ether, propyleneglycol methyl ether acetate, and the dibasic ester solvent sold by Dupont. Alcohols such as 2-ethylhexanol and butanol are less preferred and therefore their presence is minimized when possible.

The formulas of several hydroxyl-functional polyesters which were used in the preparation of the coil coating compositions of this invention are given in TABLE I, along with the solids content, hydroxyl number, and Gardner-Holdt viscosity of each.

TABLE I

| REACTANT | POLYESTER FORMULA (moles) | | | | | |
|---|---|---|---|---|---|---|
| | A | B | C | D | E | F |
| AA | 0.12 | 0.12 | — | 0.13 | 0.12 | — |
| IPA | 0.38 | 0.53 | — | 0.37 | 0.53 | 0.50 |
| PA | 0.50 | — | — | 0.50 | — | — |
| TP | — | 0.35 | — | — | 0.35 | 0.50 |
| HHPA | — | — | 0.76 | — | — | — |
| CHDA | — | — | 0.24 | — | — | — |
| NPG | 0.78 | 0.80 | 0.32 | 0.79 | 0.79 | — |
| HDO | 0.22 | 0.20 | — | — | 0.31 | 0.14 |
| CHDM | — | — | 0.27 | — | — | — |
| TME | — | — | 0.41 | 0.21 | — | — |
| MPD | — | — | — | — | — | 0.86 |
| % Solids | 65 | 65 | 60 | 60 | 65 | — |
| OH No. | 30 | 50 | 120 | 85 | 50 | 38 |
| Visc. | W–X | $Z_1$–$Z_3$ | $Z_3$–$Z_5$ | X–Z | — | — |

TABLE I-continued

| | POLYESTER FORMULA (moles) | | | | | |
|---|---|---|---|---|---|---|
| REACTANT | A | B | C | D | E | F |

AA = adipic acid; IPA = isophthalic acid; PA = phthalic anhydride; TP = terephthalic acid; HHPA = hexahydrophthalic anhydride; CHDA = cyclohexanedicarboxylic acid; NPG = neopentyl glycol; HDO = hexanediol; CHDM = cyclohexanedimethanol; TME = trimethylolethane; MPD = 2-methyl-1,3-propanediol The invention is further illustrated by the following examples wherein all parts are by weight unless otherwise indicated.

EXAMPLE 1

A mixture of 18.47 parts of the POLYMAC 935 polyester resin (12.0 parts of non-volatiles), 2.58 parts of Aromatic 150 solvent (Ashland), and 34 parts of titanium dioxide (TiPure R960) was sandground to a Hegman value of 7½–8. To this mixture there was added 24.05 parts of the same polyester, 5.77 parts of Cymel 303 curing agent, 1.99 parts of 2-ethyl hexanol (EHO), 2.05 parts of the 150 solvent, 2.99 parts of the methyl ether of dipropyleneglycol (DGME), 2.50 parts of Polyester C (1.5 parts nonvolatile), 1.3 parts of EPON 1001-CX-75 epoxy resin, 0.25 part of a stain resistance additive, 0.25 part of the SILWET L7500 silicone, 0.15 part of VERSAFLOW lubricant (Shamrock), 0.66 part of the NACURE 1557 curing catalyst, 0.20 part of triethanolamine (TEA). The mixture was mixed thoroughly and 1.19 parts of the SILCRON G600 flatting agent was added to adjust the gloss. This was mixed well before the viscosity was adjusted by adding 1.6 parts of the CAB-O-SIL M5 silica whereupon the intensity and duration of the mixing was minimized in order to protect the friable silica and thereby maximize its thixotropy-inducing effect. The resulting coating composition is satisfactory for the formation of a striated coating on sheet metal by the coil coating process.

TABLE II

| | EXAMPLES 2–5 | | | |
|---|---|---|---|---|
| Component | Ex. 2 | Ex. 3 | Ex. 4 | Ex. 5 |
| MILLBASE | | | | |
| Polyester A | 6.73 | 12.39 | 16.33 | — |
| Polyester E | 15.54 | — | — | — |
| Polyester E₁* | — | — | — | 22.27 |
| TiO₂ | 34.18 | 31.88 | 31.88 | 34.18 |
| DGME | 3.31 | — | — | 3.31 |
| Solvent 150 | — | 4.47 | 4.47 | — |
| LETDOWN | | | | |
| Polyester A | 4.50 | 16.64 | 16.64 | — |
| Polyester E | 11.40 | — | — | — |
| Polyester E₁* | — | — | — | 18.67 |
| Polyester C | 2.77 | — | — | — |
| Polyester D | — | 12.55 | 12.25 | — |
| Solvent 150 | 5.93 | — | 1.55 | 5.93 |
| EPON 1001 | 1.33 | — | — | 1.33 |
| Stain resist | 0.25 | — | — | 0.25 |
| Cymel 303 | 9.10 | 6.75 | — | 9.10 |
| DESMODUR BL-3175 | — | — | 6.52 | — |
| Dibutyltin dilaurate | — | — | 0.30 | — |
| SILWET L7500 | 0.25 | — | — | 0.25 |
| VERSAFLOW | 0.15 | — | — | 0.15 |
| COROC A620A2 | — | 0.71 | 0.71 | — |
| Petr. Wax | — | 1.84 | 1.84 | — |
| DGME | — | 3.12 | — | — |
| PGMEA | — | — | 3.12 | — |
| EHO | 0.91 | 1.55 | — | 0.91 |
| Butanol | — | 1.55 | — | — |
| NACURE 1557 | 0.66 | — | — | 0.66 |
| p-TSA cat. | — | 0.54 | — | — |
| TEA | 0.20 | — | — | 0.20 |
| Flatting | 1.19 | — | — | 1.19 |
| M5 Silica | 1.60 | 2.07 | 2.07 | 1.60 |
| Av OH No. | 49 | 44.3 | 43.3 | 50 |
| Thix Index | 2.56 | 2.23 | 1.20 | 1.80 |

*Polyester E₁ is substantially the same as Polyester E

The coating compositions of Examples 2 and 3 were applied to an aluminum panel with a hand-held roller having a smooth surface and the panels were baked in a 550° F. oven for 28 seconds to reach a peak metal temperature of 450° F. A pattern of striations having branches was obtained in each instance. The film from Example 3 was 0.48 mil thick in the valleys and 1.21 mils at the peaks of the striations. The film from Example 2 was 0.8 mil thick in the valley and 1.6 mils at the peaks of the striations. After 1055 hours in a QUV test cabinet, the panels of Examples 2 and 3 showed good gloss retention and good color retention.

The coating composition of Example 5 was applied to an aluminum panel with a hand-held roller having a smooth surface and the panels were baked in a 550° F. oven for 28 seconds to reach a peak metal temperature of 450° F. A pattern of striations having branches was obtained in which the film thickness in the valleys was 0.8 mil and 2.28 mils at the peaks of the striations. After 1055 hours in a QUV test cabinet, the panel of Example 5 showed good gloss retention and good color retention.

EXAMPLE 6

A coating composition having the same formulation as that of Example 2 and having a Hegman value of about 3 and a thix index of about 2.5 was applied to a coil of aluminum by a smooth applicator roll of a coil coating apparatus. The coated sheet metal was passed through an oven maintained at 485° F. in 35 seconds to obtain a peak metal temperature of 410° F. The resulting film was striated—the film thickness varying from 1.2 mils in the valleys to 1.6 mils at the peaks. The film hardness was F-H; a mandrel bend at 2T caused no cracking and no tape off; and the 60° gloss was 25–35.

While the above description illustrates preferred embodiments of the present invention, it will be appreciated that the invention is susceptible to modification, variation and change without departing from the proper scope and fair meaning of the claims.

The subject matter claimed is:

1. A method for applying a striated coating to sheet metal in a coil coating operation, said method consisting essentially of introducing into a paint pan of a coil coater a thixotropic coating composition having a thix index of from about 1.5 to about 3 and comprising:

a hydroxy-functional polyester;

a thixotropy-inducing rheologic agent; and a curing agent; transferring said composition from said paint pan to an applicator roll by rotating a pick-up roll in contact with the composition and with said applicator roll;

continuously withdrawing a sheet of metal from a coil thereof and coating said sheet by contacting it with the applicator roll; curing the coating on said sheet by passing the sheet through an oven at an elevated temperature; and continuously rewinding said sheet into a coil.

2. The method of claim 1 wherein the hydroxy-functional polyester has a hydroxyl number of from about 30 to about 120 and a viscosity of from about 1000 to about 10,000 centipoises at 25° C. (77° F.).

3. The method of claim 2 wherein the polyester is a mixture of hydroxy-functional polyesters having hydroxyl numbers of from about 30 to about 120 and viscosities of from about 1000 to about 10,000 centipoises, said mixture having an average hydroxyl number of from 4. The method of claim 3 wherein from about 60 to about 70 percent of the polyester mixture is a polyester having a hydroxyl number of about 50, from about 20 to about 30 percent is a polyester having a hydroxyl number of about 30, and from about 5 to about 10 percent is a polyester having a hydroxyl number of about 120, all on a weight basis.

5. The method of claim 3 wherein from about 65 to about 75 weight percent of the polyester mixture is a polyester having a hydroxyl number of about 30 and from about 25 to about 35 weight percent is a polyester having a hydroxyl number of about 85.

6. The method of claim 1 wherein the thixotropic coating composition has a thix index of from about 1.5 to about 2.5.

7. The method of claim 1 wherein the thixotropic coating composition has a thix index of about 2.

8. In the coating step of claim 1, transferring an amount of the composition from the applicator roll to the sheet to form a layer which will have an average dry thickness of from about 1 mil to about 3 mils.

9. In the coating step of claim 8, forming striations composed of peaks and valleys wherein the peaks stand from about 0.3 to about 2.5 mils above the valleys.

10. The method of claim 1 wherein the curing agent is a blocked isocyanate.

11. The method of claim 1 wherein the curing agent is an aminoplast resin and the composition further comprises a blocked acidic catalyst.

* * * * *

UNITED STATES PATENT AND TRADEMARK OFFICE
CERTIFICATE OF CORRECTION

PATENT NO.    : 5,516,549
DATED         : May 14, 1996
INVENTOR(S)   : Jasenof et al.

It is certified that error appears in the above-indentified patent and that said Letters Patent is hereby corrected as shown below:

Col. 4, Ln. 48, correct "DESMOTHERMXP-" to read
       -- DESMOTHERM XP- --.
Col. 9, Ln. 15, after "from" insert -- about 40 to about 60.--.

Signed and Sealed this

Twenty-third Day of September, 1997

Attest:

BRUCE LEHMAN

*Attesting Officer*    *Commissioner of Patents and Trademarks*